A. WOOD, 3D.
WATER BACK FOR GAS PORTS.
APPLICATION FILED JAN. 7, 1910.

968,018.

Patented Aug. 23, 1910.
2 SHEETS—SHEET 1.

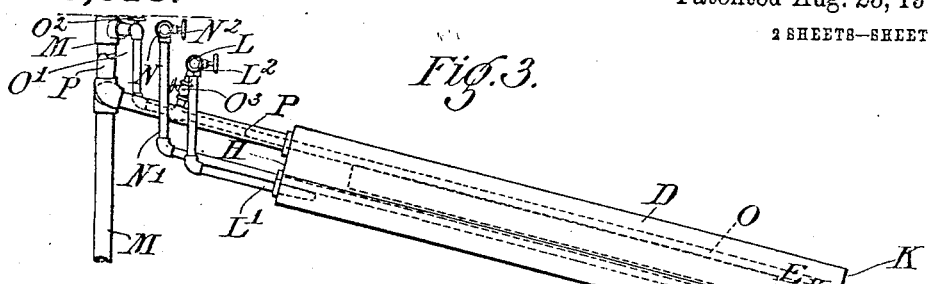
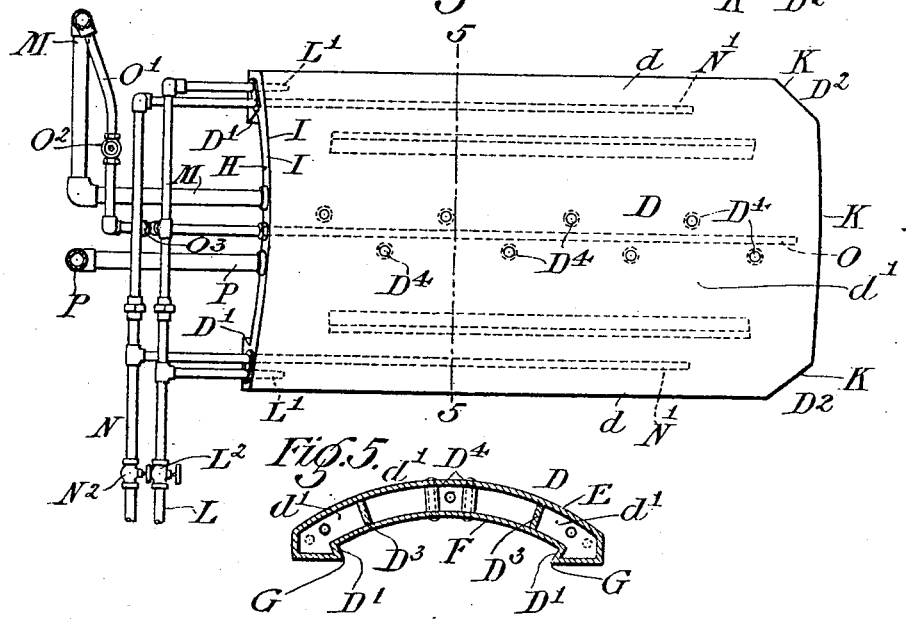
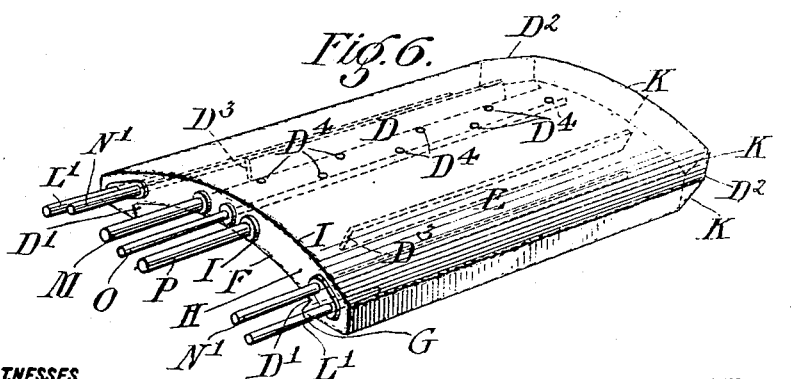

UNITED STATES PATENT OFFICE.

ALAN WOOD, 3D, OF CONSHOHOCKEN, PENNSYLVANIA.

WATER-BACK FOR GAS-PORTS.

968,018.  Specification of Letters Patent.  Patented Aug. 23, 1910.

Application filed January 7, 1910. Serial No. 536,779.

*To all whom it may concern:*

Be it known that I, ALAN WOOD, 3d, a citizen of the United States of America, residing in Conshohocken, in the county of Montgomery, in the State of Pennsylvania, have invented a certain new and useful Improvement in Water-Backs for Gas-Ports, of which the following is a true and exact description, reference being had to the accompanying drawings, which form a part thereof.

My invention relates to the construction of water backs especially designed for use in connection with a gas port arch of regenerative furnaces, and it has for its object to provide a water back which will, in the most effective way, prevent the overheating and consequent destruction of the arch overlying the gas port and forming the bottom of the air port.

The nature of my improvements will be best understood as described in connection with the drawings in which—

Figure 1:
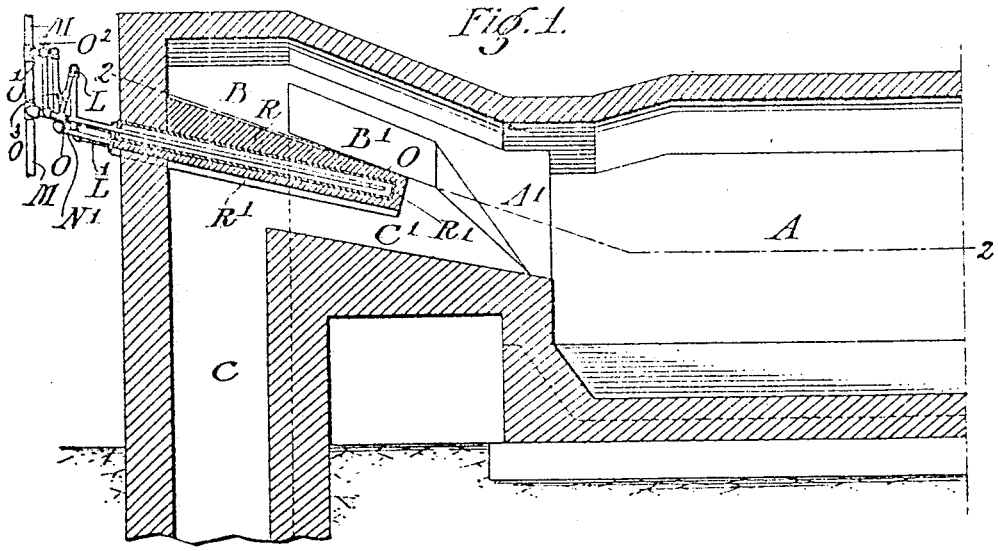
Figure 2:
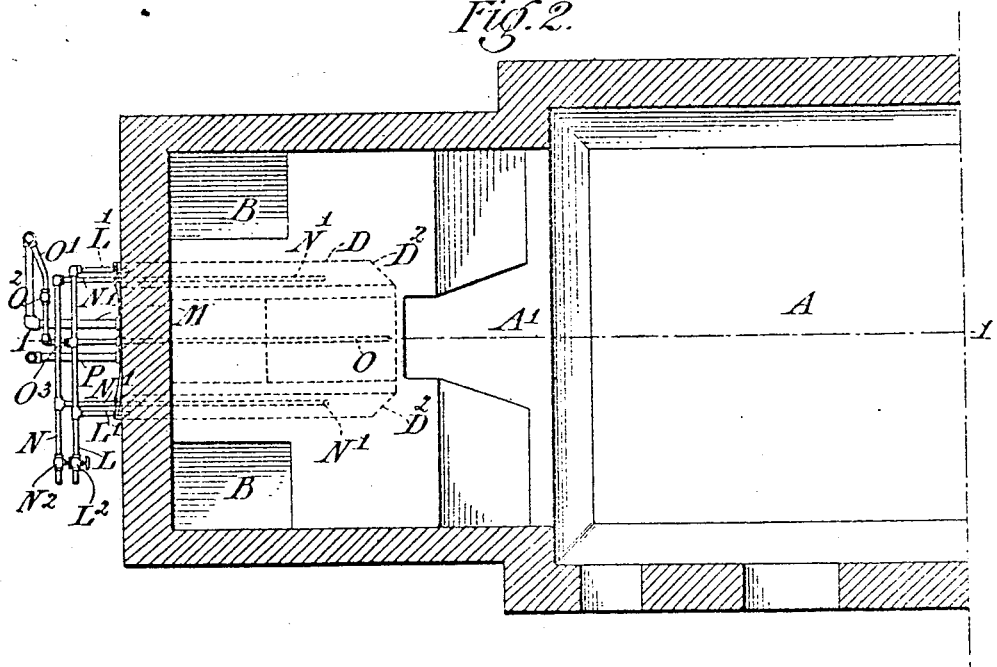

Figure 1 is a sectional elevation taken on the line 1—1 of Fig. 2 through one end of a regenerative open hearth furnace and through the center of the gas port. Fig. 2 is a sectional plan view taken on the line 2—2 of Fig. 1. Fig. 3 is a side elevation on an enlarged scale of the water back and its water circulating connections. Fig. 4 is a plan view of the water back and its connections. Fig. 5 a section on the line 5—5 of Fig. 4, and Fig. 6 a perspective view of the water back.

A, is the body of the open hearth furnace, A' being the port through which the mixed air and gas enters the furnace and through which on the reversal of the regenerative system the heated products leave the furnace.

B, B, are the air ports leading from a regenerator, not shown, and merging into a common air port B' which in turn merges into the port A'.

C is the gas port leading from a regenerator, not shown, and communicating through the lateral port C' with port A'.

D is the water back for the arch separating the air and gas ports before they merge into the port A'. It is preferably of arch shape, as shown, and, preferably, also formed with skewbacks D', D', to support a lining of the refractory brick on the underside of the water back, such a lining being shown at R' in Fig. 1. The water back is made up of sheet metal of substantially uniform thickness, all the joints being of a butt-welded character with careful avoidance of all lapping seams.

In the construction shown the body of the water back is made up of two sheets bent to proper form and indicated at E and F, these sheets being welded together in butt-welded seams at G G, see Figs. 5 and 6. The upper end of the water back is formed by a plate H butt-welded to the plates E and F at I, I, and the lower end of the water back is formed by the plate J butt-welded to the plates E and F at K, K. The butt-welding of the necessary joints between the plates making up the water back and the entire avoidance of lapped seams in the parts exposed to high temperature greatly prolongs the life of the structure.

Stays $D^4$, $D^4$, etc., are provided to strengthen and stiffen the water back and by preference the lower and inner end of the water back has its corners of truncated form, as indicated at $D^2$, thus avoiding sharp angular corners at the part exposed to the greatest heat, and also providing for a better circulation in this part of the water back and for the avoidance of the collection of mud and other impurities which would have a tendency to settle in the sharp corners of the back if they existed at these points.

I divide the interior of the water back into three communicating chambers by means of longitudinal partitions $D^3$, $D^3$, the lateral, and narrower chambers being indicated at $d$, $d$, and the intermediate and larger chamber being indicated at $d'$.

Cooling water is introduced into the upper end of the water back which, by preference, extends through the outer wall of the furnace, as shown in Fig. 1, from the supply pipe L having delivery nozzles L', L', through which the water enters the upper ends of the lateral chambers $d$, $d$.

$L^2$ is a stop cock for closing the water supply pipe.

M, is the outflow or waste pipe leading from the top of the outer end of the water back and P is a similarly situated additional waste or outflow pipe.

O is a pipe leading through the outer end of the water back through the body thereof and opening near the lower and inner end.

This pipe connects through a pipe O' with the waste pipe M, O² indicating a stop cock in the pipe O' and the pipe O also connects with the main water supply through the cock O².

In normal operation the water enters in through the pipes L' and circulates through the chambers d, d, and d', the larger quantity of the waste water escaping through the outlet pipe M, with a certain restricted amount escaping through the small pipe O and thence through the pipe O' either to the continuation of the pipe M or to waste in any other way. In this mode of use the valve O³ is closed and the valve O² opened. When at any time it is desired to secure a more energetic circulation, particularly in the lower end of the water back, the valve O² is closed and the valve O³ opened whereupon water is introduced through the pipe O and delivered directly into the lower end of the water back with the effect of thoroughly stirring up any sediment which may have accumulated.

N is an auxiliary supply pipe having branches N', N', leading through the back of the furnace and through chambers d, d, to near the lower end thereof. These are brought into use by opening cock N² when additional cooling water is needed.

The water back is introduced into the furnace through the outer wall thereof, as shown in Figs. 1 and 2, and a lining of refractory firebrick, preferably supported on the skewbacks D', D', is placed between the lower side of the water back and the gas port, while a covering of refractory material is placed over the top of the water back, as indicated at R. This covering, which may be of a sandy character, will more or less melt and flow down over the lower end of the water back forming a covering R', at this point.

Having now described my invention, what I claim as new and desire to secure by Letters Patent is,

1. A water back for the gas port arch of a regenerative furnace having its interior divided into connecting lateral and central chambers by longitudinal partitions in combination with water inlet nozzles directed into the rear of the lateral chambers and an outlet for water leading from its top rear portion.

2. A water back for the gas port arch of a regenerative furnace having its interior divided into connecting lateral and central chambers by longitudinal partitions in combination with water inlet nozzles directed into the rear of the lateral chambers, a main water outlet leading from its top rear portion and a restricted water outlet leading from its lower front end.

3. A water back for the gas port arch of a regenerative furnace having its interior divided into connecting lateral and central chambers by longitudinal partitions in combination with water inlet nozzles directed into the rear of the lateral chambers, a main water outlet leading from its top rear portion, a pipe leading through the water back to its front lower end and means for connecting said pipe to a water outlet and to a source of water supply.

4. A water back for the gas port arch of a regenerative furnace having its interior divided into connecting lateral and central chambers by longitudinal partitions and the corners of its front lower portion truncated, in combination with water inlet nozzles directed into the rear of the lateral chambers and an outlet for water leading from its top rear portion.

5. A water back for the gas port arch of a regenerative furnace having its interior divided into connecting lateral and central chambers by longitudinal partitions and the corners of its front lower portion truncated, in combination with water inlet nozzles directed into the rear of the lateral chambers, a main water outlet leading from its top rear portion and a restricted water outlet leading from its lower front end.

6. A water back for the gas port arch of a regenerative furnace made of sheet metal connected by butt-welds and without lapping seams in the parts thereof exposed to high heats, said water back being provided with means for circulating water therethrough.

ALAN WOOD, 3RD.

Witnesses:
 WM. WRIGHT,
 W. F. BARRETT.